(12) United States Patent
Fujinaka et al.

(10) Patent No.: US 8,553,343 B2
(45) Date of Patent: Oct. 8, 2013

(54) SHIELDING STRUCTURE AND IMAGING DEVICE SUPPORT STRUCTURE

(75) Inventors: Hiroyasu Fujinaka, Osaka (JP);
Koichiro Hirabayashi, Osaka (JP);
Kazuo Shibukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 109 days.

(21) Appl. No.: 13/158,575

(22) Filed: Jun. 13, 2011

(65) Prior Publication Data

US 2011/0304919 A1    Dec. 15, 2011

(30) Foreign Application Priority Data

Jun. 14, 2010    (JP) .................................. 2010-134767

(51) Int. Cl.
*G02B 5/22* (2006.01)
*G02B 7/00* (2006.01)
*G03B 9/00* (2006.01)

(52) U.S. Cl.
USPC ............................. 359/892; 359/896; 396/458

(58) Field of Classification Search
None
See application file for complete search history.

(56) References Cited

U.S. PATENT DOCUMENTS 7,840,129 B2 * 11/2010 Tanaka ........................... 396/55
2003/0214588 A1 * 11/2003 Takizawa et al. ........ 348/207.99

FOREIGN PATENT DOCUMENTS

| JP | 02-294099 | 12/1990 |
| JP | 03-064152 | 6/1991 |
| JP | 60-004376 | 1/1995 |
| JP | 10-278563 | 10/1998 |
| JP | 2001-21976 | 1/2001 |
| JP | 2005-181541 | 7/2005 |
| JP | 2006-100878 | 4/2006 |
| JP | 2007-072303 | 3/2007 |
| JP | 2008-205723 | 9/2008 |
| JP | 2010-28471 | 2/2010 |

* cited by examiner

*Primary Examiner* — Jade R Chwasz
(74) *Attorney, Agent, or Firm* — Renner, Otto, Boisselle & Sklar, LLP

(57) ABSTRACT

An imaging device support structure includes a master flange having an opening portion through which an optical axis passes, an imaging device which is directly or indirectly attached to the master flange and is positioned in the opening portion as viewed in an optical axis direction, and a shielding member which shields a gap between the master flange and the imaging device in the opening portion. The shielding member includes a slit or a groove and is pressed against an opening edge of the opening portion.

23 Claims, 13 Drawing Sheets

SHIELDING STRUCTURE AND IMAGING DEVICE SUPPORT STRUCTURE

CROSS-REFERENCE TO RELATED APPLICATION

This application claims priority to Japanese Patent Application No. 2010-134767 filed on Jun. 14, 2010, the disclosure of which including the specification, the drawings, and the claims is hereby incorporated by reference in its entirety. In addition, this application is related to Japanese Patent Publication No. 2011-119592 filed on May 27, 2011, the entire disclosure of which is incorporated by reference herein.

BACKGROUND

The present disclosure relates to a shielding structure for shielding an opening portion and an imaging device support structure.

Conventionally, various shielding structures for shielding an opening portion such as a gap, etc., have been known. One such structure is a shielding structure in an imaging device support structure.

For example, in an imaging device support structure according to Japanese Patent Publication No. 2008-205723, a mask member, a low-pass filter, a protective member, an imaging device, a holding member, and a flexible print substrate are provided in this order at the back side of a CCD holder. The protective member spreads toward the imaging device like a skirt. An inner edge (a front edge) of the protective member contacts the low-pass filter, and an outer edge (a rear edge) of the protective member contacts the holding member. The imaging device is located inside the protective member and is fixed to the holding member via an adhesive. The holding member is attached to the CCD holder via a plurality of screws. Thus, the protective member shields a gap between the low-pass filter and the holding member so that foreign substances such as dust and dirt do not enter an imaging plane of the imaging device.

SUMMARY

In the imaging device support structure of Japanese Patent Publication No. 2008-205723, a tilt of the imaging device is adjusted by adjusting a tightening amount of the plurality of screws. However, in this structure, twists and warps might be formed in the protective member depending on the tightening amount of the screws. The above-described twists and warps might cause positional shifts between the protective member and the low-pass filter or between the protective member and the holding member. When such positional shifts occur, foreign substances such as dust and dirt can enter from the outside and attach to the imaging plane of the imaging device.

In view of the foregoing, techniques disclosed herein have been devised, and it is an object of the present disclosure to reduce, in a shielding structure in which a shielding member for shielding an opening portion such as a gap, etc. is pressed, formation of a large gap due to twists and warps in the shielding member.

A shielding structure according to the present disclosure includes a first member having an opening portion through which an axis passes, a shielding member which shields the opening portion, and a second member which presses a part of the shielding member located inside the opening portion toward the first member along a direction of the axis, and at least one slit or groove is provided in the shielding member.

An imaging device support structure according to the present disclosure includes a master flange having an opening portion through which an optical axis passes, an imaging device which is directly or indirectly attached to the master flange and is positioned in the opening portion as viewed in a direction of the an optical axis, and a shielding member which shields a gap between the master flange and the imaging device in the opening portion, and the shielding member includes at least one slit or groove and is pressed against an opening edge of the opening portion along the direction of the optical axis.

Furthermore, another imaging device support structure according to the present disclosure includes a master flange having an opening portion through which an optical axis passes, an attachment member attached to the master flange, an imaging device which is attached to the attachment member and is positioned in the opening portion as viewed in a direction of the optical axis, and a shielding member which shields a gap between the master flange and the attachment member in the opening portion, and the shielding member includes at least one slit or groove and is pressed against an opening edge of the opening portion in the direction of the optical axis.

In the shielding structure, even when the shielding member is pressed by the second member, twists and warps in the shielding member are reduced by the at least one slit or groove provided in the shielding member. As a result, a gap between the shielding member and the first member can be prevented or reduced.

Moreover, in the imaging device support structures, even when the shielding member is pressed against the opening edge of the opening portion, twists and warps in the shielding member are reduced by the at least one slit or groove provided in the shielding member. As a result, the gap between the shielding member and the opening edge of the opening portion can be prevented or reduced.

DETAILED DESCRIPTION

Example embodiments will be described below.

First Embodiment

Figure 1:
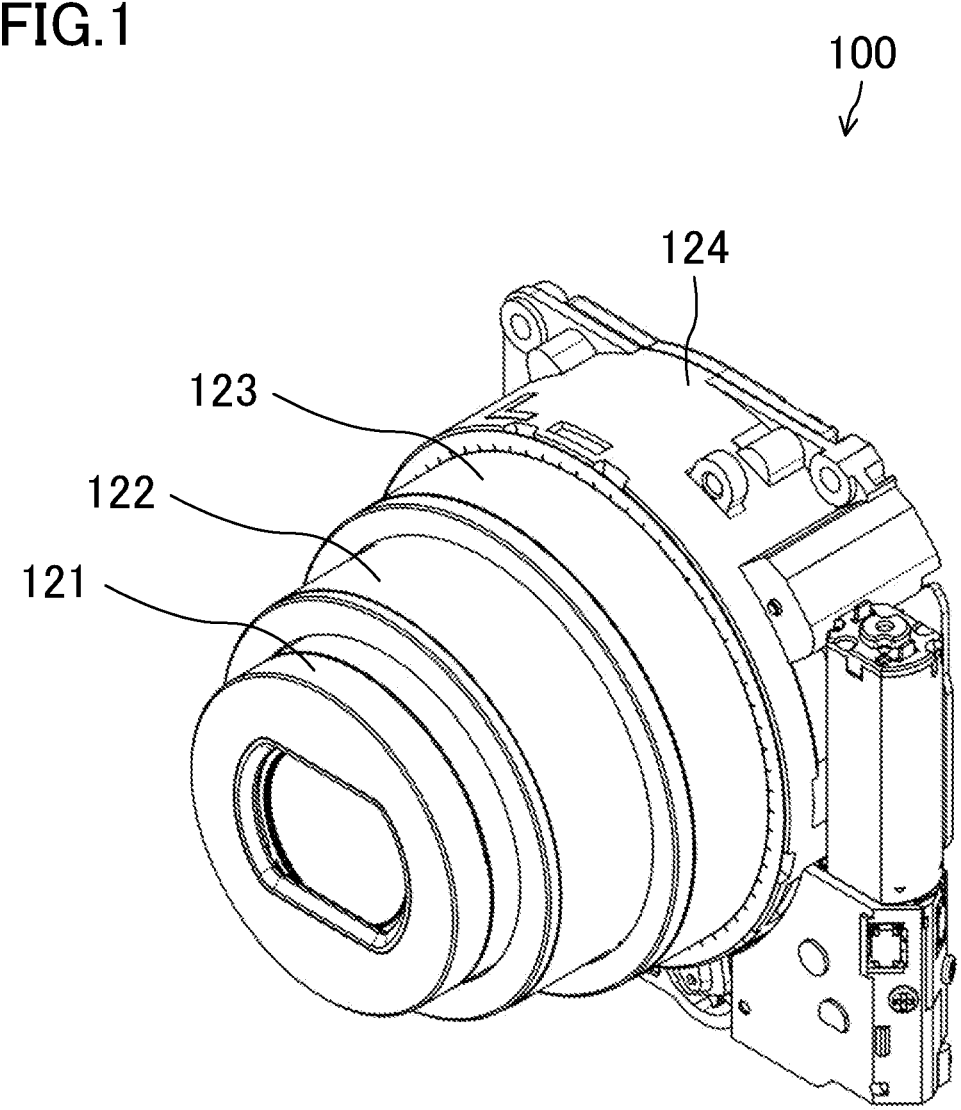
FIG. 1 is a perspective view of a lens barrel according to a first embodiment as viewed obliquely from the front.
Figure 2:
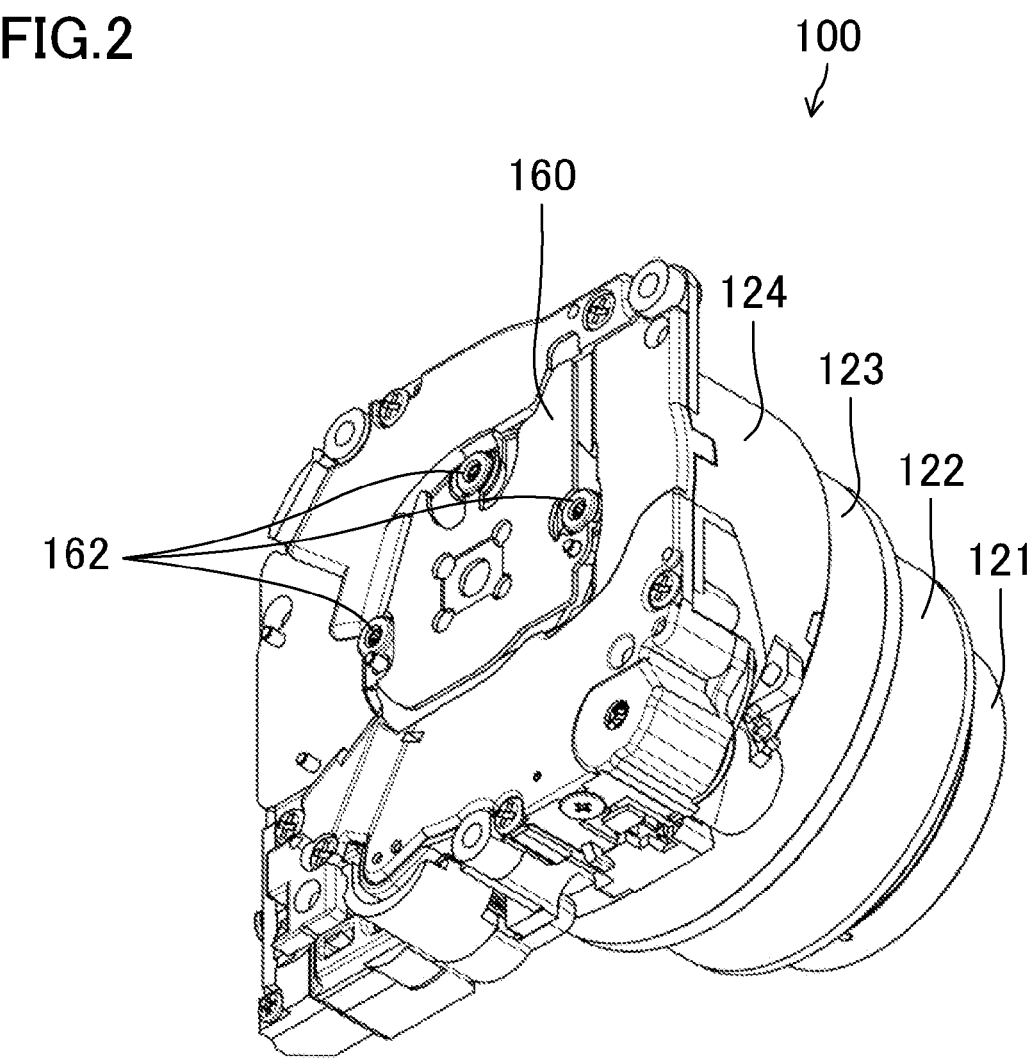
FIG. 2 is a perspective view of the lens barrel as viewed obliquely from the behind.
Figure 3:
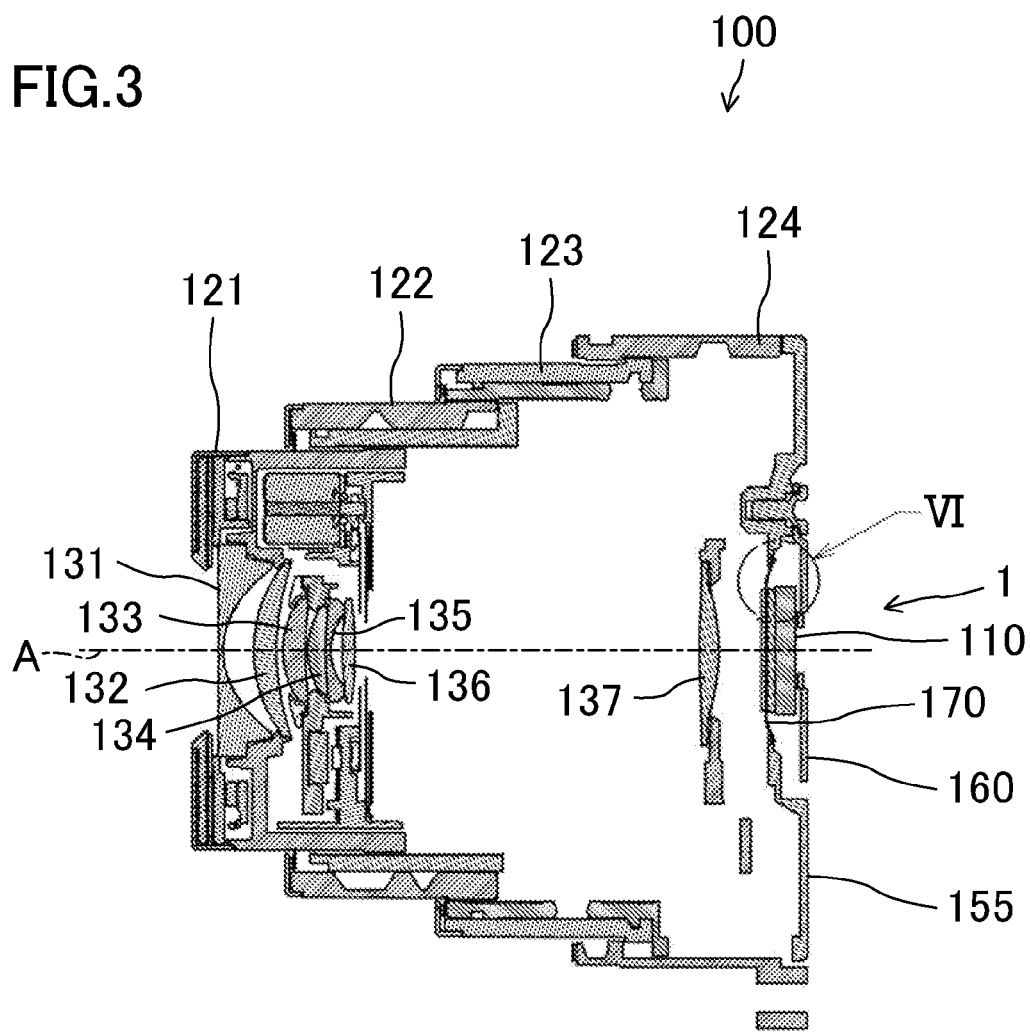
FIG. 3 is a longitudinal-sectional view of the lens barrel.

FIG. 1 is a perspective view of a lens barrel 100 according to a first embodiment as viewed obliquely from the front, FIG. 2 is a perspective view of the lens barrel as viewed obliquely from the behind, and FIG. 3 is a cross-sectional view of the lens barrel.

[1. Configuration of Lens Barrel 100]

In this embodiment, a shielding structure in a lens barrel 100 will be described. The shielding structure is a part of an imaging device support structure 1 (e.g., as show in FIGS. 3 and 4).

The lens barrel 100 is used for an imaging apparatus such as a digital still camera and a video movie, etc. The lens barrel 100 includes an optical system having various lenses such as a zoom lens and a focus lens, etc. therein, and an imaging device 110 which converts incident light into an electrical signal to output the electrical signal. A light beam from an object is formed as an optical image in the imaging device 110 via the optical system. The imaging device 110 is comprised, for example, of a charge coupled device (CCD) sensor or a complementary metal-oxide semiconductor (CMOS) sensor.

The lens barrel 100 is of a collapsible type. Specifically, the lens barrel 100 includes a first lens barrel 121, a second lens barrel 122 which houses the first lens barrel 121, a third lens barrel 123 which houses the second lens barrel 122, and a fixed lens barrel 124 which houses the third lens barrel 123. The fixed lens barrel 124 is almost entirely housed in a camera body. When image shooting is performed, the first lens barrel 121 is brought out of the second lens barrel 122, the second lens barrel 122 is brought out of the third lens barrel 123, or the third lens barrel 123 is brought out of the fixed lens barrel 124. On the other hand, when image shooting is not performed, the first lens barrel 121 is stored in the second lens barrel 122, the second lens barrel 122 is stored in the third lens barrel 123, and the third lens barrel 123 is stored in the fixed lens barrel 124. Thus, when image shooting is not performed, the lens barrel 100 is stored in the camera body.

An optical system of the lens barrel 100 includes a lens group which takes in an optical image, and a zoom lens group, and a focus lens group. Each of the above-described lens groups is held by an associated one of lens frames and cam frames, and is configured to be movable in an optical axis A direction or a direction of an optical axis A (FIG. 3). When image shooting is performed, distances between lens groups are adjusted, and the zoom and focus of an optical image are adjusted. A light beam from an object which has passed through the lens groups is formed as an optical image in the imaging device 110.

The zoom lens group includes zoom lenses 131-136. The zoom lenses 131-136 are driven by a zoom motor unit in the optical axis A direction. The focus lens group includes a focus lens 137. The focus lens 137 is driven by a focus motor unit in the optical axis A direction.

Figure 4:
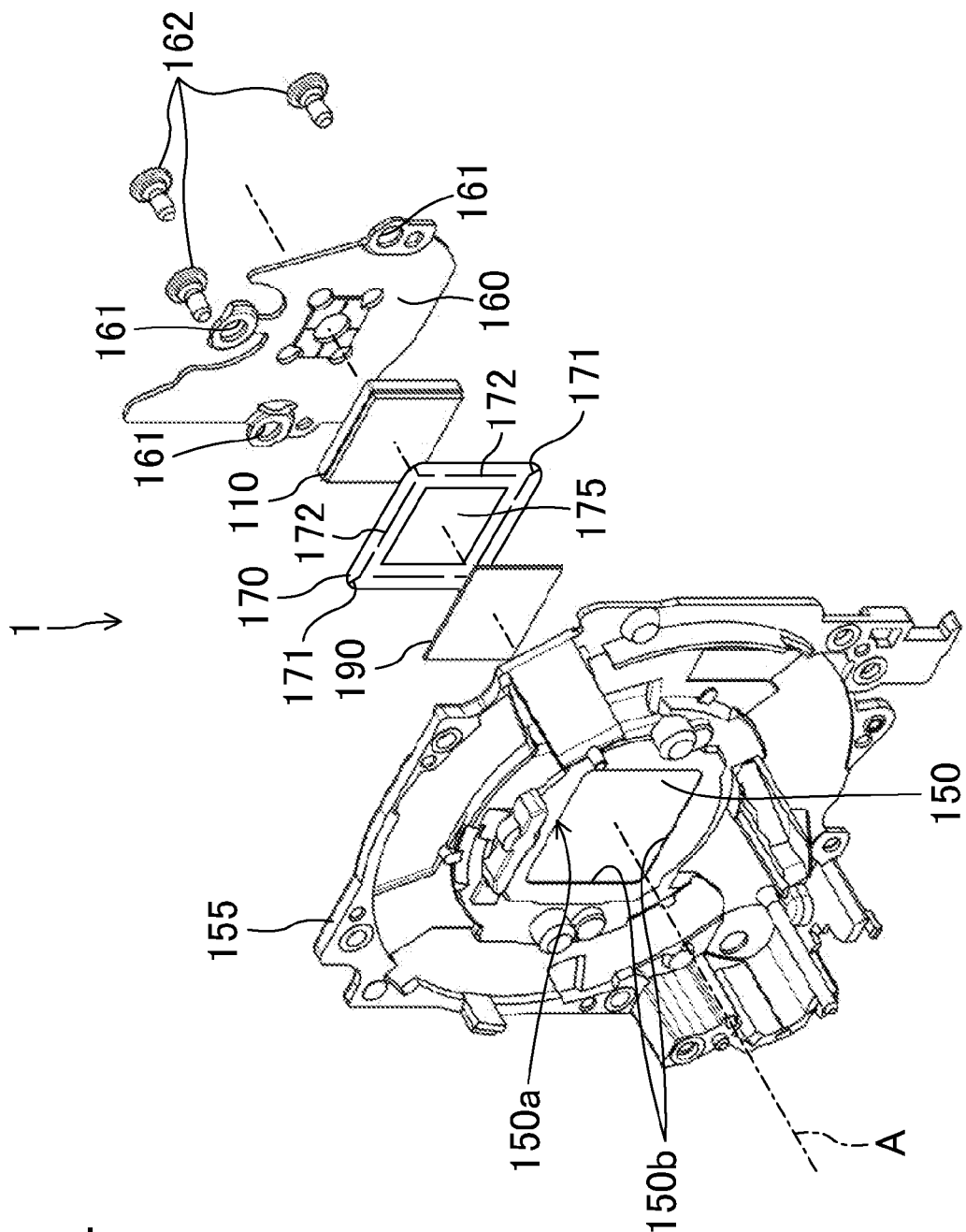
FIG. 4 is an exploded perspective view of a part of the lens barrel located on the periphery of the imaging device.
Figure 5:
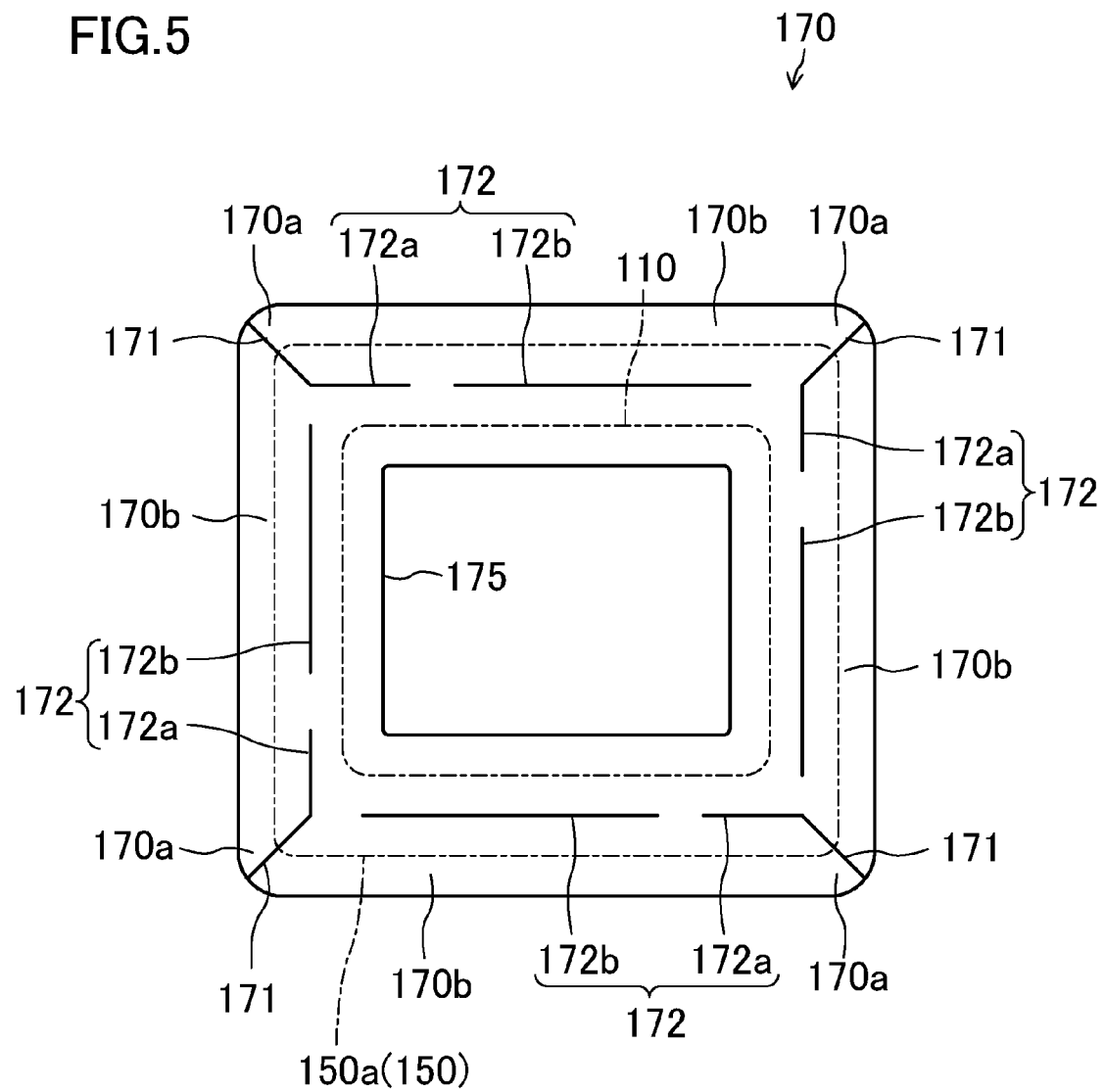
FIG. 5 is a front view of a dust-proof sheet.
Figure 6:
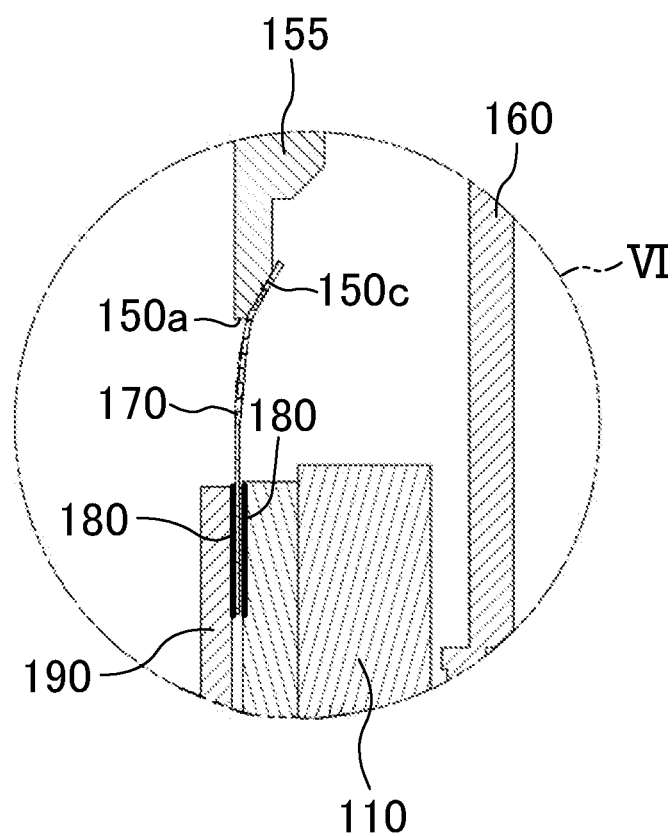
FIG. 6 is an enlarged cross-sectional view illustrating an enclosed part VI of the lens barrel of FIG. 3.

The lens barrel 100 includes an imaging device support structure 1. FIG. 4 is an exploded perspective view of a part of the lens barrel located on the periphery of the imaging device. FIG. 5 is a front view of a dust-proof sheet. FIG. 6 is an enlarged cross-sectional view illustrating an enclosed part VI of the lens barrel of FIG. 3. As shown in FIGS. 3 and 4, the imaging device support structure 1 includes a master flange 155 having a first opening portion 150 through which an optical axis A passes, an attachment plate 160 attached to the master flange 155, an imaging device 110 supported by the attachment plate 160 and positioned inside the first opening portion 150 as viewed in the optical axis A direction, and a dust-proof sheet 170 which shields a gap between the master flange 155 and the imaging device 110 in the first opening portion 150. Note that, in the following description, for convenience sake, a front side is a side closer to an object in the optical axis A direction, and a rear side is an opposite side to the front side. A back face means a surface of any member facing the rear side.

The master flange 155 is a substantially plate-shaped member. The first opening portion 150 is formed substantially at the center of the master flange 155 to pass therethrough. The first opening portion 150 has a substantially rectangular shape. Specifically, the first opening portion 150 has a pair of substantially straight long sides extending in parallel to each other, a pair of substantially straight short sides extending in parallel to each other. Four corner portions of the first opening portion 150 are rounded. Three screw holes (not shown) for screwing the attachment plate 160 to the master flange 155 are provided in the back face of the master flange 155. The master flange 155 forms a first member.

The imaging device 110 is a substantially plate-shaped member. The imaging device 110 has a substantially rectangular shape which is smaller than the first opening portion 150. The imaging device 110 is attached indirectly to the master flange 155 with the attachment plate 160 interposed therebetween. The imaging device 110 forms a second member.

The dust-proof sheet 170 is made of an elastic, light-blocking plastic thin plate, for example. The dust-proof sheet 170 is formed to have a substantially rectangular frame shape. Specifically, the dust-proof sheet 170 has four corner portions 170a, 170a . . . , and four side portions 170b, 170b . . . as shown in FIG. 5. That is, the dust-proof sheet 170 has a substantially rectangular outer circumference and includes at the center thereof a second opening portion 175 having a substantially rectangular shape. The outer circumference of the dust-proof sheet 170 is larger than the first opening portion 150 of the master flange 155. The second opening portion 175 is smaller than the imaging device 110. Referring specifically to FIG. 6, an opening edge portion of the second opening portion 175 of the dust-proof sheet 170 is adhered to a peripheral portion at the front face of the imaging device 110 via a double-sided adhesive tape 180. A filter glass 190 is adhered to the front face of the dust-proof sheet 170 via the double-sided adhesive tape 180 to cover the second opening portion 175. The dust-proof sheet 170 forms a shielding member.

The attachment plate 160 is a substantially plate-shaped member. Three through holes 161, 161 . . . through which screws 162, 162 . . . are inserted are provided in the attachment plate 160. The imaging device 110 is adhered to the attachment plate 160. The attachment plate 160 forms an attachment member.

When the attachment plate 160 is attached to the master flange 155 via the screws 162, 162 . . . , the imaging device 110 is positioned inside the first opening portion 150 of the master flange 155 as viewed in the optical axis A direction. The dust-proof sheet 170 contacts an opening edge 150a of the first opening portion 150 from the back side of the master flange 155. In this case, the dust-proof sheet 170 contacts the entire circumference of the opening edge 150a of the first opening portion 150. Since the imaging device 110 is smaller than the first opening portion 150, a gap is formed between the master flange 155 and the imaging device 110 in the first opening portion 150. However, the gap is shielded by the dust-proof sheet 170. Thus, the entrance of a foreign substance such as dust and dirt into the lens barrel 100 through the gap can be prevented or reduced.

In this case, a tilt of the imaging device 110 relative to the optical axis A can be adjusted by adjusting a tightening amount of each of the three screws 162, 162 . . . . That is, the screw holes of the master flange 155, the through holes 161, 161 . . . in the attachment plate 160, and the screws 162, 162 . . . form a tilt adjustment mechanism.

[2. Configuration of Dust-Proof Sheet 170]

Referring again to FIG. 5, a configuration of the dust-proof sheet 170 will be described in detail. A first slit 171 is formed in each of the corner portions 170a of the dust-proof sheet 170 to inwardly extend from an outer edge of the dust-proof sheet 170. The first slit 171 extends toward an associated one of corner portions of the second opening portion 175. With the dust-proof sheet 170 placed on the master flange 155, the first slit 171 extends at least to reach the inside of the first opening portion 150 (shown by a one-dot chain line in FIG. 5). Also, a second slit 172 is formed in each of the side portions 170b of the dust-proof sheet 170. The second slit 172 includes a second slit 172a connected to an associated one of the first slits 171 and a second slit 172b which is not connected to any one of the first slits 171. The second slits 172a and 172b are not connected to each other but are arranged in a straight line. Note that when the second slit 172a and the second slit 172b are not distinguished from each other, both of the second slits 172a and 172b are merely referred to as "the second slits 172." With the dust-proof sheet 170 placed on the master flange 155, the second slits 172 are positioned outside the imaging device 110 (shown by a one-dot chain line in FIG. 5) and inside the first opening portion 150 (i.e., in the gap between the master flange 155 and the imaging device 110 in the first opening portion 150), and extend along the opening edge 150a of the first opening portion 150. The term "to extend along" as used herein does not necessarily mean to extend in parallel to a target portion such as the opening edge 150a, but means to extend substantially in the same direction as the direction as that in which a target portion extends. Specifically, the second slits 172 extend along substantially straight portions 150b, 150b . . . of the opening edge 150a of the first opening portion 150. Also, the term "substantially straight" as used herein does not strictly mean straight, but includes substantially straight shapes. That is, herein, the term "substantially straight" can mean an elongated shape, which may be a slightly curved shape. More specifically, as shown in FIG. 6, in the back face of the master flange 155, the opening edge 150a of the first opening portion 150 is chamfered, and the opening edge 150a is a plane tilted relative to the optical axis A. That is, in the back face of the master flange 155, the opening edge 150a of the first opening portion 150 is a tilted surface 150c having a certain width. In this case, the dust-proof sheet 170 contacts the tilted surface 150c as the opening edge 150a of the first opening portion 150. The second slits 172 preferably extend along substantially straight portions of the inner circumference edge (a lower edge portion in FIG. 6) of the tilted surface 150c.

When being placed on the master flange 155, the dust-proof sheet 170 configured in the above-described manner is pressed against the opening edge 150a of the first opening portion 150 of the master flange 155, and is deformed so that a central portion of the dust-proof sheet 170 to which the imaging device 110 is adhered protrudes forward as compared to a peripheral portion thereof. In such a case, twists and warps formed in the dust-proof sheet 170 are absorbed by the first and second slits 171 and 172. Thus, the gap between the dust-proof sheet 170 and the master flange 155 can be reduced, and peeling of the dust-proof sheet 170 from the imaging device 110 or the filter glass 190 can be prevented or reduced.

That is, as in this embodiment, in the configuration in which the dust-proof sheet 170 is pressed against the master flange 155 and the dust-proof sheet 170 is deformed so that the central portion thereof protrudes forward as compared to the peripheral portion thereof, twists and warps are formed in the dust-proof sheet 170. As a result, wrinkles are formed in the dust-proof sheet 170. Specifically, in this embodiment, since the outer circumference edge is a free end, in such a configuration, wrinkles are readily formed in a contact portion of the dust-proof sheet 170 and the opening edge 150a of the first opening portion 150, and a gap might be formed in the contact portion of the dust-proof sheet 170 and the opening edge 150a of the first opening portion 150. When repulsion due to elasticity of the dust-proof sheet 170 is large, adhesion between the dust-proof sheet 170 and the imaging device 110 or the filter glass 190 might be removed.

However, according to this embodiment, twists and warps in the dust-proof sheet 170 can be absorbed by the first and second slits 171 and 172. Specifically, the first slits 171 inwardly extend from the outer edge of the dust-proof sheet 170, and thus, when the dust-proof sheet 170 is deformed so that the central portion thereof protrudes forward, parts of the dust-proof sheet 170 located at both sides of the first slit 171 overlap each other to absorb wrinkles in the dust-proof sheet 170. In this embodiment, the first opening portion 150 has a substantially quadrangular shape. Thus, when the dust-proof sheet 170 is deformed in the above-described manner, stress is readily concentrates at a part of the dust-proof sheet 170 corresponding to each corner portion of the first opening portion 150, and deformation also readily concentrates at each corner portion. In contrast, the first slits 171 extend toward the inside of the first opening portion 150 via the corner portions of the first opening portion 150, and thus, concentration of stress at parts of the dust-proof sheet 170 corresponding to the corner portions of the first opening portion 150 can be reduced, so that deformation of the dust-proof sheet 170 can be reduced. As a result, formation of a gap between the dust-proof sheet 170 and the corner portions of the first opening portion 150 can be prevented or reduced. Also, peeling of the dust-proof sheet 170 from the imaging device 110 or the filter glass 190 can be prevented or reduced.

Furthermore, the second slits 172a are connected to the first slits 171. Thus, the dust-proof sheet 170 can be readily deformed so that the parts of the dust-proof sheet 170 located at both sides of each first slit 171 overlap each other. That is, the second slits 172a can assist the function of the first slits 171, so that concentration of stress at the parts of the dust-proof sheet 170 corresponding to the corner portions of the first opening portion 150 can be reduced, and formation of wrinkles in the dust-proof sheet 170 can be reduced.

With the imaging device 110 pressed by the attachment plate 160, the central portion of the dust-proof sheet 170 is pressed forward. However, deformation of the dust-proof sheet 170 caused at this time can be absorbed by the second slits 172. That is, even when the central portion of the dust-proof sheet 170 is pressed forward, the second slits 172 are opened, and thus, parts of the dust-proof sheet 170 located outside the second slits 172 are not pressed forward as much as the central portion. Accordingly, formation of wrinkles in the parts of the dust-proof sheet 170 located outside the second slits 172 can be prevented or reduced. As a result, formation of a gap at a contact portion of the dust-proof sheet 170 and the opening edge 150a of the first opening portion 150 can be prevented or reduced.

Note that the second slits 172 are opened, and accordingly, gaps are formed in the dust-proof sheet 170. However, as compared to a gap formed in the contact portion of the dust-proof sheet 170 and the opening edge 150a of the first opening portion 150 when there is no second slit 172, a gap at each second slit 172 is small. Specifically, the dust-proof sheet 170 is deformed so that a part of the dust-proof sheet 170 located inside the second slits 172 shift forward, and a part thereof outside the second slits 172 shift rearward. This is deformation in a direction along the thickness of the dust-proof sheet 170, and the dust-proof sheet 170 has a certain thickness. Thus, when the amount of shifts of the parts of the dust-proof sheet 170 located inside and outside the second slits 172 is equal to or smaller than the thickness of the dust-proof sheet 170, a gap is not formed at each second slit 172. Even when the amount of shifts of the parts of the dust-proof sheet 170 located inside and outside the second slits 172 is larger than the thickness of the dust-proof sheet 170, a gap formed at each second slit 172 is not as large as the amount of shifts, that is, smaller than the amount of shifts by the thickness of the dust-proof sheet 170.

Also, the second slits 172 are opened, thereby preventing or reducing formation of wrinkles in the parts of the dust-proof sheet 170 located inside the second slits 172. As a result, peeling of the dust-proof sheet 170 from the imaging device 110 or the filter glass 190 can be prevented or reduced.

Furthermore, the second slits 172a of the second slits 172 are connected to the first slits 171. Thus, the dust-proof sheet 170 can be readily deformed so that the parts of the dust-proof sheet 170 located at both sides of each second slit 172 shift from each other. That is, the first slits 171 can assist the function of the second slits 172.

Therefore, according to this embodiment, the imaging device support structure 1 includes the master flange 155 having the first opening portion 150 through which the optical axis A passes, the imaging device 110 which is indirectly attached to the master flange 155 and is positioned in the first opening portion 150 as viewed in the optical axis A, and the dust-proof sheet 170 which shields a gap between the master flange 155 and the imaging device 110 in the first opening portion 150. The dust-proof sheet 170 includes slits, and is pressed against the opening edge 150a of the first opening portion 150. Thus, even in a configuration in which the dust-proof sheet 170 is pressed against the opening edge 150a of the first opening portion 150, twists and warps in the dust-proof sheet 170 are reduced by the slits provided in the dust-proof sheet 170. As a result, a gap between the dust-proof sheet 170 and the opening edge 150a of the first opening portion 150 can be prevented or reduced.

The slits in the dust-proof sheet 170 include the first slits 171 each inwardly extending from the outer edge of the dust-proof sheet 170. Thus, the parts of the dust-proof sheet 170 located at both sides of each first slit 171 overlap each other, so that formation of twists and warps in the peripheral portion of the dust-proof sheet 170 can be prevented or reduced.

The first opening portion 150 has a substantially quadrangular shape, and the first slits 171 are provided in the corner portions of the first opening portion 150. In the dust-proof sheet 170, stress readily concentrates in the corner portions of the first opening portion 150, and thus, wrinkles are readily formed. Since the first slits 171 are provided in the corner portions of the first opening portion 150, concentration of stress in parts of the dust-proof sheet 170 located in the corner portions of the first opening portion 150 can be reduced.

The slits of the dust-proof sheet 170 includes the second slits 172 which are formed in a part of the dust-proof sheet 170 exposed through the gap in the first opening portion 150 to extend along the opening edge 150a of the first opening portion 150. With the above-described configuration, even when the central portion of the dust-proof sheet 170 is pressed forward, deformation of parts of the dust-proof sheet 170 located at both sides of each second slit 172 can be reduced.

Furthermore, the second slits 172 are formed substantially in parallel to the opening edge 150a. Thus, when the second slits 172 are opened to reduce deformation of the dust-proof sheet 170, twists formed in the dust-proof sheet 170 can be reduced. Specifically, since the opening edge 150a restrains the dust-proof sheet 170, with the second slits 172 provided to be tilted relative to the opening edge 150a, some twists might be formed in the dust-proof sheet 170 when the second slits 172 are opened to reduce deformation of the dust-proof sheet 170. However, when the second slits 172 are formed substantially in parallel to the opening edge 150a, twists formed in the dust-proof sheet 170 because a portion which restrains deformation of the dust-proof sheet 170 and the second slits 172 are not in parallel can be reduced. Note that, even when the second slits 172 are tilted relative to the opening edge 150a, twists in the dust-proof sheet 170 can be reduced as compared to the configuration in which there is no second slit 172. In a strict sense, a portion of the opening edge 150a which contacts the dust-proof sheet 170 restrains the dust-proof sheet 170. In this embodiment, the portion of the opening edge 150a restraining the dust-proof sheet 170 is an inner circumference edge of the tilted surface 150c which is located at the back face of the master flange 155 and forms the opening edge 150a. Therefore, it is more preferable that the second slits 172 are substantially in parallel to the inner circumference edge of the tilted surface 150c.

Furthermore, the first opening portion 150 has a substantially quadrangular shape, and the second slits 172 extend along the substantially straight portions 150b of the opening edge 150a of the first opening portion 150. The opening edge 150a of the first opening portion 150 constrains the dust-proof sheet 170, and the substantially straight portions 150b of the opening edge 150a of the first opening portion 150 occupy a large portion of the opening edge 150a. Therefore, with the second slits 172 formed to extend along the substantially straight portions 150b, formation of twists and warps in the dust-proof sheet 170 can be effectively reduced.

The first slit 171 is connected to the second slit 172a. Thus, prevention or reduction of wrinkles in the peripheral portion of the dust-proof sheet 170 by the first slits 171 can be assisted by the second slits 172a, and reduction of deformation of the parts of the dust-proof sheet 170 located at both sides of each second slit 172 by the second slits 172 can be assisted by the first slits 171.

Furthermore, the first slits 171 are provided in the corner portions of the first opening portion 150, and the second slits 172 extend along the substantially straight portions 150b of the opening edge 150a of the first opening portion 150. Thus, concentration of stress in the dust-proof sheet 170 at the corner portions of the first opening portion 150 can be reduced by the first slits 171, and deformation of the parts of the dust-proof sheet 170 extending along the substantially straight portions 150b can be reduced by the second slits 172.

The imaging device support structure 1 further includes a tilt adjustment mechanism capable of adjusting a tilt of the imaging device 110 relative to the master flange 155. The adjustment mechanism can adjust the tilt of the imaging device 110 relative to the master flange 155 by adjusting the press amount of the imaging device 110 against the master flange 155. In such a configuration, when the press amount of the imaging device 110 against the master flange 155 is adjusted, the press amount of the dust-proof sheet 170 against the master flange 155 varies. Therefore, the slits 171 and 172 are provided in the dust-proof sheet 170, and thus, even when the press amount of the dust-proof sheet 170 varies, formation of twists and warps in the dust-proof sheet 170 can be reduced.

Second Embodiment

Figure 7:
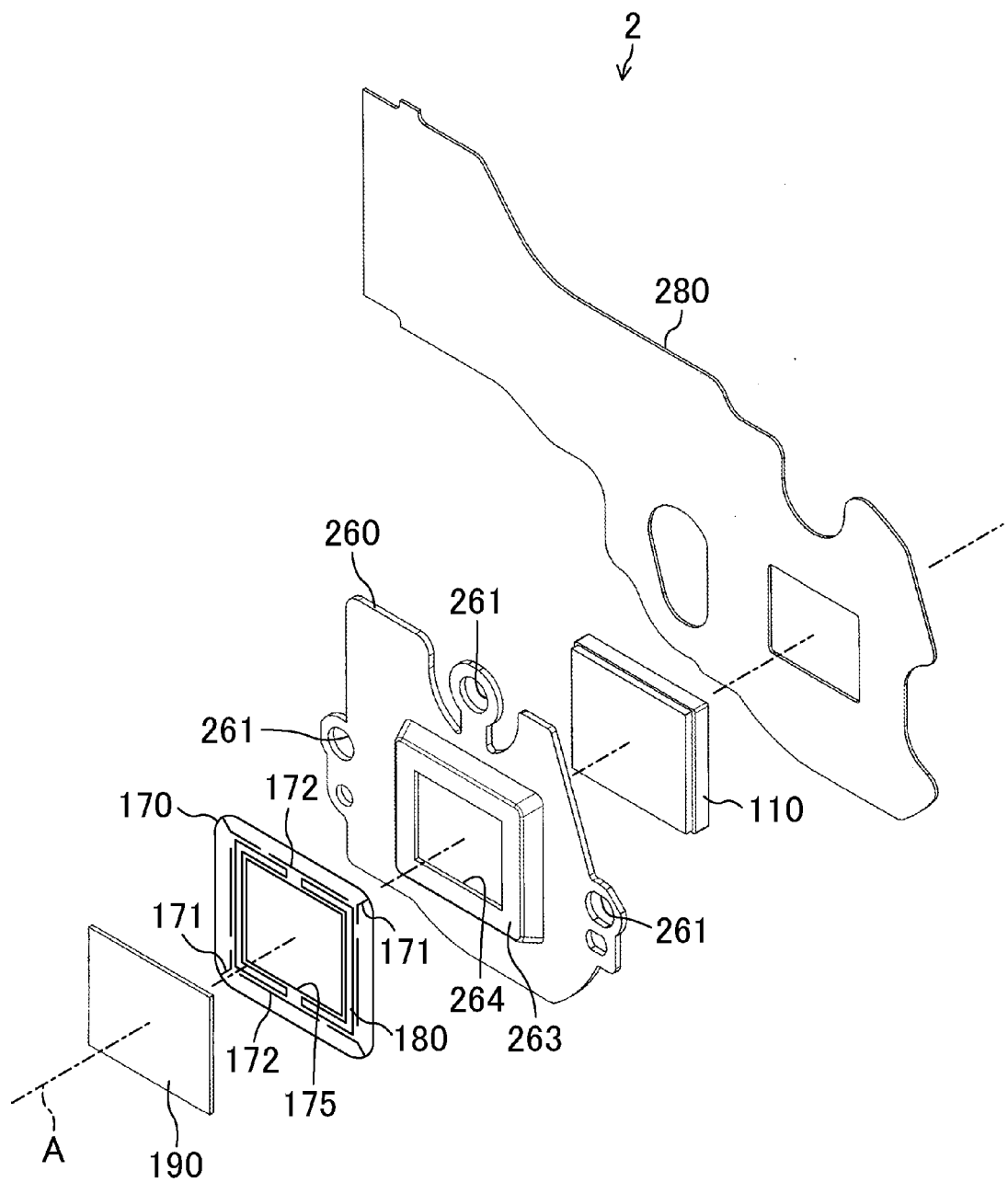
FIG. 7 is an exploded perspective view of an imaging device support structure according to a second embodiment.
Figure 8:
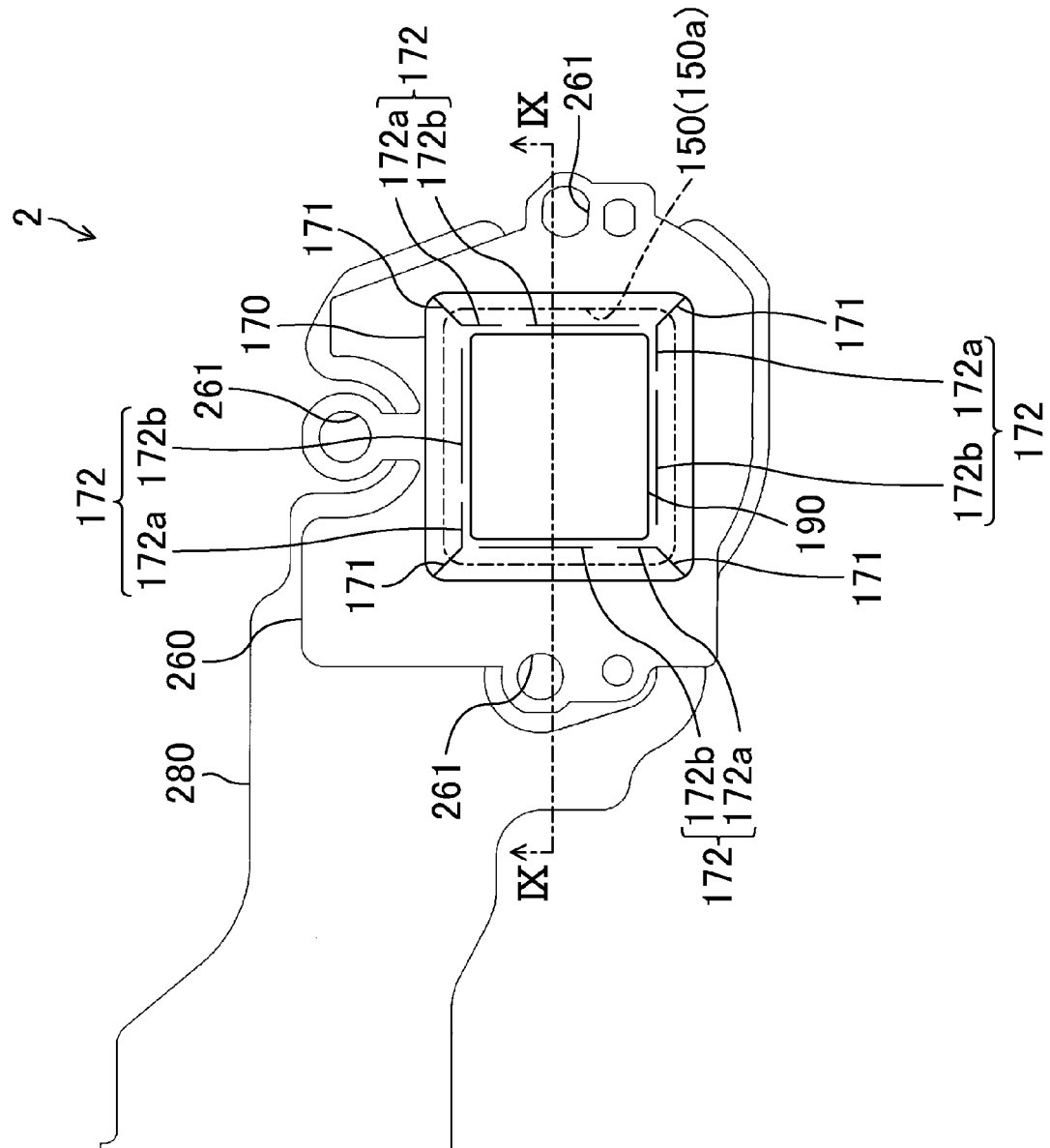
FIG. 8 is a front view of an imaging device structure.
Figure 9:
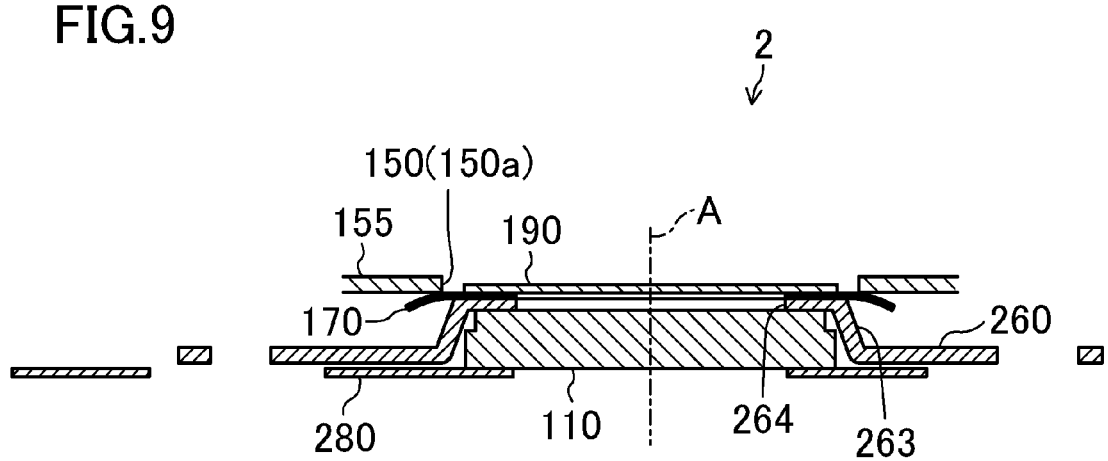
FIG. 9 is a cross-sectional view of the imaging device structure taken along the line IX-IX of FIG. 8.

Subsequently, a second embodiment will be described. FIG. 7 is an exploded perspective view of an imaging device support structure according to the second embodiment, FIG. 8 is a front view of the imaging device support structure, and FIG. 9 is a cross-sectional view taken along the lint IX-IX.

In an imaging device support structure 2 according to the second embodiment, an imaging device 110 and a dust-proof sheet 170, etc. are arranged in a different manner from that in the first embodiment. Therefore, each member also shown in the first embodiment is identified by the same reference character, the description thereof will be omitted, and the configuration of each of different parts will be mainly described.

The imaging device support structure 2 includes a master flange 155 (shown only in FIG. 9), an attachment plate 260 fixed to the master flange 155, an imaging device 110 supported by the attachment plate 260 and positioned in a first opening portion 150 as viewed in an optical axis A direction, and a dust-proof sheet 170 which shields a gap between the master flange 155 and the attachment plate 260 in the first opening portion 150.

The attachment plate 260 is a plate-shaped member. Three through holes 261, 261 . . . through which screws (not shown) are inserted are provided in the attachment plate 260. A raised portion 263 which is raised forward is provided at the center of the attachment plate 260. The raised portion 263 has a substantially rectangular shape which is larger than the imaging device 110 and smaller than the first opening portion 150 of the master flange 155. An opening portion 264 is formed at the center of the raised portion 263 to pass therethrough. The imaging device 110 is fitted in the raised portion 263 from the back side, and an imaging plane of the imaging device 110 is exposed through the opening portion 264 to face forward. A peripheral portion of the front face of the imaging device 110 is adhered to the raised portion 263 of the attachment plate 260 from the back side. The attachment plate 260 forms an attachment member.

The dust-proof sheet 170 is adhered to the front face of the raised portion 263 of the attachment plate 260. A second opening portion 175 in the dust-proof sheet 170 is smaller than the raised portion 263 and larger than the opening portion 264. A filter glass 190 is adhered to the front face of the dust-proof sheet 170 via a double-sided adhesive tape to cover the second opening portion 175.

A flexible substrate 280 is attached to the back face of the imaging device 110. The flexible substrate 280 is electrically coupled to the imaging device 110.

The attachment plate 260 configured in the above-described manner is attached to the master flange 155 via screws. Thus, the imaging device 110 is indirectly attached to the master flange 155 with the attachment plate 260 interposed therebetween. In this state, the imaging device 110 and the raised portion 263 are positioned in the first opening portion 150 of the master flange 155 as viewed in the optical axis A direction. The dust-proof sheet 170 contacts an opening edge 150a of the first opening portion 150 from the back side of the master flange 155. In this case, the dust-proof sheet 170 contacts the entire opening edge 150a of the first opening portion 150. Since the raised portion 263 is smaller than the first opening portion 150, a gap is formed between the master flange 155 and the raised portion 263 in the first opening portion 150. However, the gap is shielded by the dust-proof sheet 170. Thus, entrance of a foreign substance such as dust and dirt into the lens barrel 100 through the gap can be prevented or reduced.

That is, in contrast to the first embodiment in which the dust-proof sheet 170 shields the gap between the master flange 155 and the imaging device 110, the dust-proof sheet 170 shields the gap between the master flange 155 and the attachment plate 260 in the second embodiment. Even in the above-described configuration, the dust-proof sheet 170 is deformed, by attaching the attachment plate 260 to the master flange 155, so that the central portion thereof to which the raised portion 263 is attached protrudes forward as compared to the peripheral portion thereof. In this case, twists and warps are formed in the dust-proof sheet 170, but the twists and warps are absorbed by the first and second slits 171 and 172. Thus, the gap between the dust-proof sheet 170 and the master flange 155 can be reduced, and peeling of the dust-proof sheet 170 from the imaging device 110 and the filter glass 190 can be prevented or reduced.

Therefore, according to this embodiment, the imaging device support structure 2 includes the master flange 155 having the first opening portion 150 through which the optical axis A passes, the attachment plate 260 attached to the master flange 155, the imaging device 110 attached to the attachment plate 260 and positioned in the first opening portion 150 as viewed in the optical axis A direction, and the dust-proof sheet 170 which shields a gap between the master flange 155 and the attachment plate 260 in the first opening portion 150. The dust-proof sheet 170 includes slits 171 and 172 and is pressed against the opening edge 150a of the first opening portion 150. Thus, even in a configuration in which the dust-proof sheet 170 is pressed against the opening edge 150a of the first opening portion 150, twists and warps in the dust-proof sheet 170 are reduced by the slits 171 and 172 provided in the dust-proof sheet 170. As a result, the gap between the dust-proof sheet 170 and the opening edge of the first opening portion 150 can be prevented or reduced.

Third Embodiment

Figure 10:
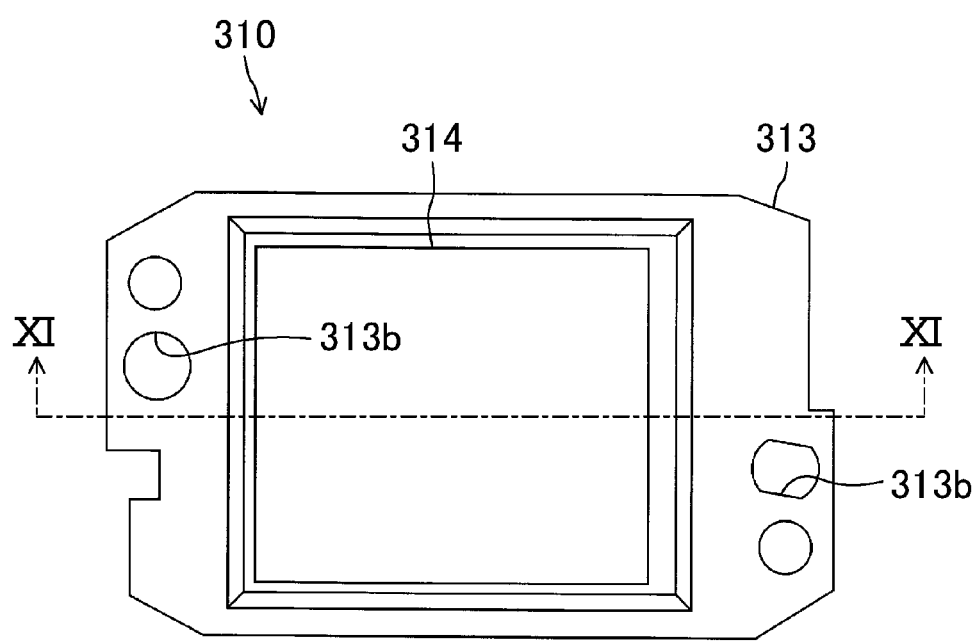
FIG. 10 is a front view of an imaging device according to a third embodiment.
Figure 11:
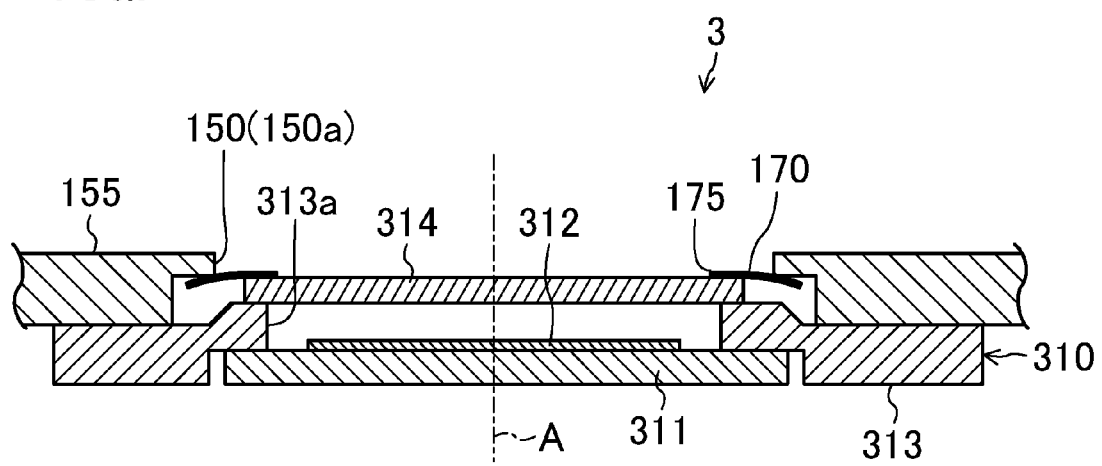
FIG. 11 is a cross-sectional view of the imaging device support structure taken along the line XI-XI of FIG. 10.

Subsequently, a third embodiment will be described. FIG. 10 is a front view of an imaging device according to the third embodiment, and FIG. 11 is a cross-sectional view of an imaging device support structure taken along the line XI-XI of FIG. 10.

An imaging device support structure 3 according to the third embodiment is different from the imaging device support structure 1 of the first embodiment in that an imaging device is directly attached to a master flange. Therefore, each member also shown in the first embodiment is identified by the same reference character, the description thereof will be omitted, and the configuration of each of different parts will be mainly described.

An imaging device 310 according to the third embodiment includes a ceramic substrate 311, a semiconductor device 312 provided on one principal surface of the ceramic substrate 311, a plate-shaped resin package 313 having an opening portion 313a at the center thereof, and a cover glass 314 which covers the opening portion 313a of the resin package 313.

The ceramic substrate 311 is a plate-shaped member having a substantially rectangular shape. The semiconductor device 312 has a substantially rectangular shape, and has the photoelectric conversion function.

The opening portion 313a of the resin package 313 has a substantially rectangular shape which is smaller than the ceramic substrate 311 and larger than the semiconductor device 312. The ceramic substrate 311 is attached to the resin package 313 from the back side. In this case, the semiconductor device 312 is positioned in the opening portion 313a. The cover glass 314 is attached to the front face of the resin package 313 to cover the opening portion 313a. Through holes 313b, 313b through which screws are inserted are formed in the resin package 313 to pass therethrough. The imaging device 310 is attached to the master flange 155 (shown only in FIG. 11) via the screws inserted through the 313b, 313b. The resin package 313 forms an attachment portion.

In this case, the dust-proof sheet 170 (shown only in FIG. 11) is adhered to the front face of the cover glass 314. The configuration of the dust-proof sheet 170 is similar to that of the first embodiment. The second opening portion 175 of the dust-proof sheet 170 is smaller than the cover glass 314. The dust-proof sheet 170 is adhered to the front face of the cover glass 314 so that a large part of the cover glass 314 is exposed through the second opening portion 175.

With the imaging device 310 attached to the master flange 155, the cover glass 314 is positioned in the first opening portion 150 of the master flange 155 as viewed in the optical axis A direction. The dust-proof sheet 170 is pressed against the opening edge 150a of the first opening portion 150 of the master flange 155, and the central portion of the dust-proof sheet 170 to which the imaging device 310 is adhered protrudes forward as compared to the peripheral portion thereof. In this case, first slits (not shown) in the dust-proof sheet 170 extend toward the inside of the first opening portion 150 via the corner portions of the first opening portion 150. Second slits (not shown) in the dust-proof sheet 170 are positioned outside the imaging device 310 and inside the opening edge 150a of the first opening portion 150, and extend along the opening edge 150a. Twists and warps formed in the dust-proof sheet 170 are absorbed by the first and second slits. Thus, the gap between the dust-proof sheet 170 and the master flange 155 can be prevented or reduced, and peeling of the dust-proof sheet 170 from the cover glass 314 can be prevented or reduced.

Fourth Embodiment

Figure 12:
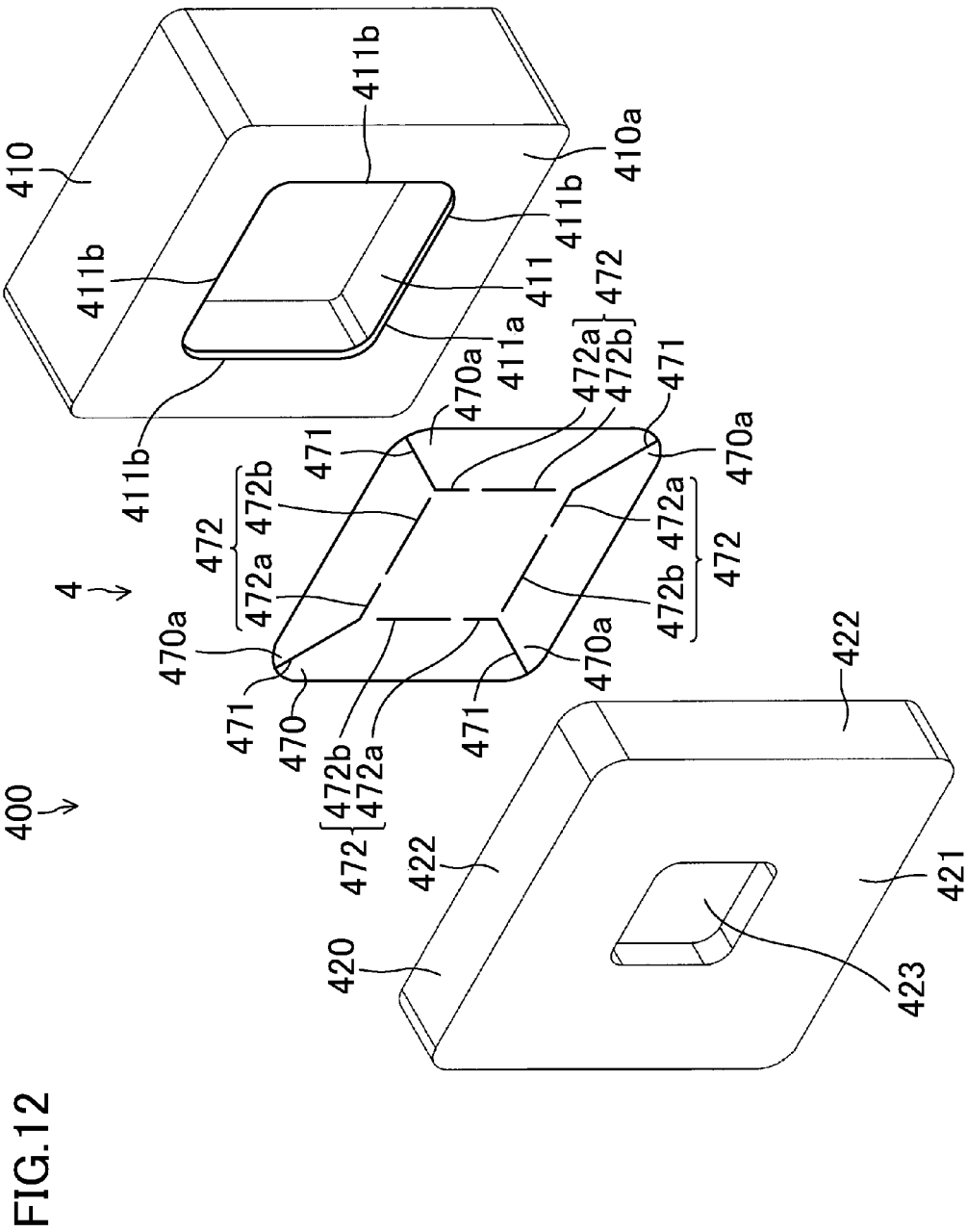
FIG. 12 is an exploded perspective view of a container according to a fourth embodiment.
Figure 13:
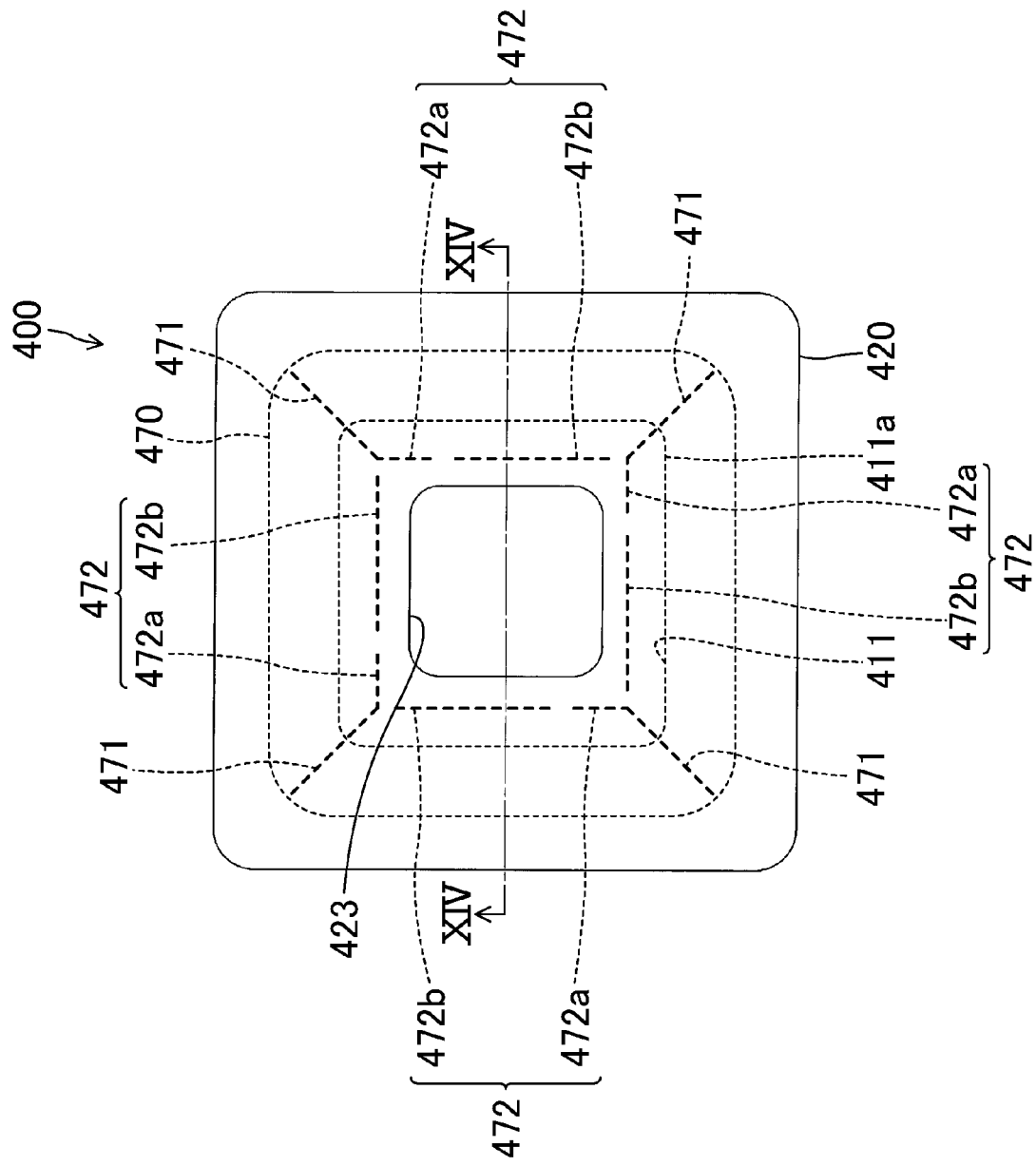
FIG. 13 is a front view of the container.
Figure 14:
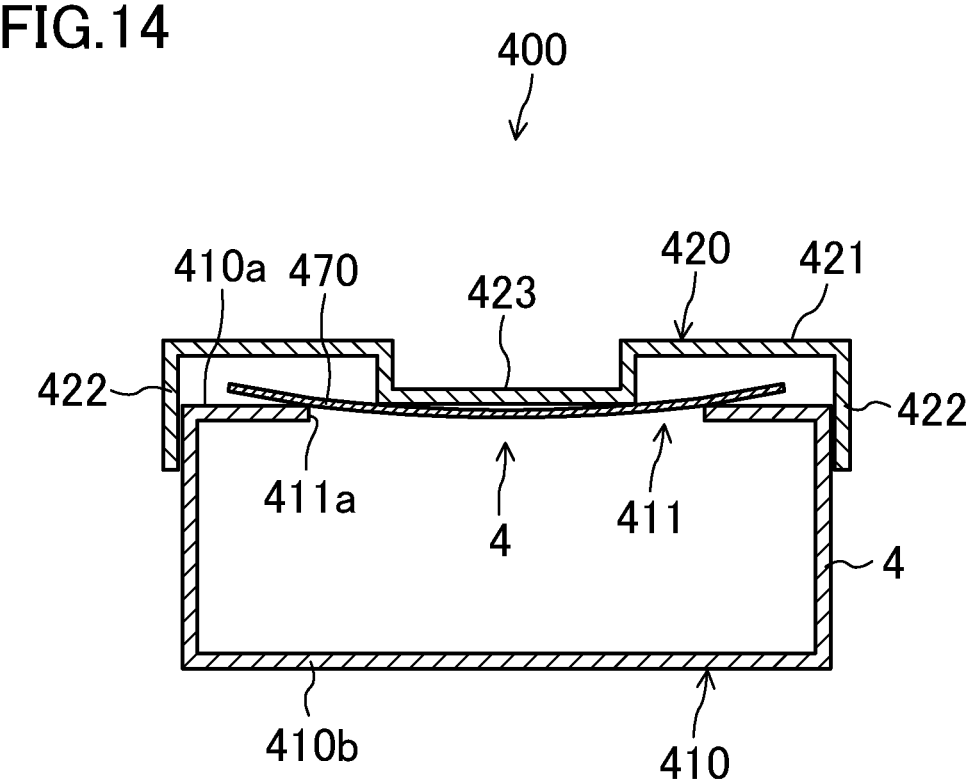
FIG. 14 is a cross-sectional view of the container taken along the line XIV-XIV of FIG. 13.

Subsequently, a fourth embodiment will be described. FIG. 12 is an exploded perspective view of a container according to the fourth embodiment, FIG. 13 is a front view of the container of the fourth embodiment, and FIG. 14 is a cross-sectional view of the container taken along the line XIV-XIV.

A container 400 according to the fourth embodiment is, for example, a container for storing food, etc. The container 400 includes a case 410 and a lid 420. The container 400 includes a shielding structure 4.

The case 410 is a substantially hollow rectangular parallelepiped member. Each of a pair of wall portions 410a and 410b of the parallelepiped member facing each other is formed to have a substantially square shape. A substantially square opening portion 411 is formed in the center of one of the pair of the wall portions, i.e., the wall portion 410a to pass therethrough. The case 410 forms a first member.

The lid 420 includes a principal wall portion 421 having a substantially square shape which is larger than the wall portion 410a of the case 410, and four peripheral walls 422, 422 . . . each of which extends perpendicularly from a circumference edge of the principal wall portion 421. A recess portion 423 is formed at the center of the principal wall portion 421 to be inwardly recessed. That is, the recess portion 423 is recessed in the same direction as the direction in which the peripheral walls 422 extend from the principal wall portion 421. A cross section of the recess portion 423 has a substantially square shape which is smaller than the opening portion 411. In a state where the lid 420 is placed on the case 410, the recess portion 423 is positioned inside the opening portion 411. The lid 420 forms a second member.

A dust-proof sheet 470 is provided between the case 410 and the lid 420. The dust-proof sheet 470 is made of an elastic, light-blocking plastic thin plate. The dust-proof sheet 470 is formed to have a substantially square shape which is smaller than the wall portion 410a of the case 410 and larger than the opening portion 411. The dust-proof sheet 470 is placed on the case 410 to cover the opening portion 411. The dust-proof sheet 470 forms a shielding member.

More specifically, a first slit 471 is formed in each of corner portions 470a of the dust-proof sheet 470 to inwardly extend from an outer edge of the dust-proof sheet 470. With the dust-proof sheet 470 placed on the case 410, the first slit 471 extends toward the corner portion of the opening portion 411, and reaches at least the inside of the opening portion 411. Also, in the dust-proof sheet 470, a second slit 472 is formed to extend along each of sides of the dust-proof sheet 470. Each of the second slits 472 includes a second slit 472a connected to an associated one of the first slits 471 and a second slit 472b which is not connected to any one of the first slits 471. The second slits 472a and 472b are not connected to each other but are arranged in a straight line. With the dust-proof sheet 470 placed between the case 410 and the lid 420, the second slits 472 are positioned outside the recess portion 423 of the lid 420 and inside the opening portion 411 of the case 410, and extend along the opening edge 411a of the opening portion 411. Specifically, the second slits 472 extend along substantially straight portions 411b of opening edge 411a of the opening portion 411 at an outer face of the wall portion 410a of the case 410. In this embodiment, the second slits 472 are formed in parallel to the substantially straight portions.

The shielding structure 4 includes the case 410, the lid 420, and the dust-proof sheet 470 configured in the above-described manner. The shielding structure 4 will be described in detail below.

The dust-proof sheet 470 is placed at a position to cover the opening portion 411 of the case 410 and, with the dust-proof sheet 470 held in the above-described state, the lid 420 is attached to the case 410. In this state, the dust-proof sheet 470 is pressed against the opening edge 411a of the opening portion 411 of the case 410 by a recess portion 423 of the 420 and is deformed so that a central portion of the dust-proof sheet 470 which the recess portion 423 contacts inwardly protrudes in the case 410 as compared to the peripheral portion thereof. In this state, the first slits 471 of the dust-proof sheet 470 extend toward the inside of the opening portion 411 via the corner portions of the opening portion 411. The second slits 472 of the dust-proof sheet 470 are positioned outside the recess portion 423 and inside the opening edge 411a of the opening portion 411, and extend along the opening edge 411a. Twist and warps formed in the dust-proof sheet 470 are absorbed by the first and second slits 471 and 472. Thus, a gap between the dust-proof sheet 470 and the opening portion 411 of the case 410 can be prevented or reduced.

Other Embodiments

Each of the above-described embodiments may have following configuration.

Specifically, the slits are not limited to the above-described shape. That is, as long as, when the dust-proof sheets 170 and 470 are deformed, the parts of the dust-proof sheet 170 and 470 located at both sides of each slit overlap each other, or the slits are opened, etc. to absorb twists and warps in the dust-proof sheets 170 and 470, the slits can be formed in any shape. For example, as long as the first and second slits 171 and 172 are formed in a part of the dust-proof sheet 170 exposed through a gap between the first opening portion 150 and the imaging device 110, the slits can be formed in any shape.

The first slits 171 and 471 and the second slits 172 and 472 are substantially straight cuts, but may be slits each having a width. Note that, in view of shielding a gap, the width of the slits is preferably as small as possible.

The widths and lengths of the first slits 171 and 471 and the second slits 172 and 472 may be set as appropriate.

For example, the first slits 171 and 471 may be provided to pass via other parts of the first opening portion 150 and the opening portion 411 than the corner portions thereof.

The second slits 172 and 472 may be formed not to be in parallel to the substantially straight portions 150b of the opening edge 150a of the first opening portion 150 or the substantially straight portions 411b of the opening edge 411a of the opening portion 411.

The second slits 172 and 472 are formed so that each of the second slits 172 is divided into the second slits 172a and 172b and each of the second slits 472 is divided into the second slits 472a and 472b, and only the second slits 172a and 472a are connected to the first slits 171 and 471, respectively. However, the configurations of the second slits 172 and 472 are not limited thereto. The second slits 172 and 472 may be configured so that each of the second slits 172a and 472a is connected to an associated one of the second slits 172b and 472b as one slit and all of the second slits 172 and 472 are connected to the first slits 171 and 471, respectively, may be employed.

Furthermore, any one of the first slits 171 and 471 and the second slits 172 and 472 may be omitted.

Instead of the first slits 171 and 471 and the second slits 172 and 472, grooves (which do not pass through the dust-proof sheet) may be formed. In this case, first grooves are formed, instead of the first slits 171 and 471, and second grooves are formed, instead of the second slits 172 and 472.

The gaps formed at the first slits 171 and 471 and the second slits 172 and 472 may be closed by a double-sided adhesive tape, etc. Thus, entrance of a foreign substance through the gaps at the first slits 171 and 471 and the second slits 172 and 472 can be prevented or reduced.

Furthermore, each of the shapes of the first slits 171 and 471 and the shapes of the second slits 172 and 472 is not limited to a substantially straight shape. Each of the first slits 171 and 471 and the second slits 172 and the 472 may be formed, for example, in a curved shape, or a zigzag shape.

The shape of the first opening portion 150 is not limited to a substantially quadrangular shape. Similarly, the shape of the opening portion 411 is not limited to a substantially quadrangular shape. Each of the first opening portion 150 and the opening portion 411 may have a circular shape, or may have some other substantially polygonal shape than a substantially quadrangular shape. Note that when the first opening portion 150 has a substantially polygonal shape, it is preferable that the first slits 171 and 471 extend near corner portions of the substantially polygonal shape.

Each of the shapes of the dust-proof sheets 170 and 470 is not limited to a substantially quadrangular shape. Each of the dust-proof sheets 170 and 470 may have a substantially circular shape, or may have some other substantially polygonal shape than a substantially quadrangular shape. Also, each of the dust-proof sheets 170 and 470 may be formed not to have the same shape as the shapes of the first opening portion 150 and the opening portion 411.

Each of the dust-proof sheets 170 and 470 is made of an elastic, light-blocking plastic thin plate. However, a material of each of the dust-proof sheets 170 and 470 is not limited to that in the above-described embodiments.

Furthermore, the configuration in which each of the imaging devices 110 and 310 is provided to be directly or indirectly attached to the master flange 155 is not limited to the above-described embodiments. As long as each of the imaging devices 110 and 310 is provided to be directly or indirectly attached to the master flange 155, any configuration can be employed.

In each of the above-described embodiments, an example in which a shielding structure is used as an imaging device support structure in the lens barrel 100 has been described. However, the present disclosure may be used for a shielding structure for some other equipment. For example, the above-described configuration may be employed for a shielding structure such as a display section or an operation section, etc. provided in a case of an electronic device. That is, an electronic device is configured so that, in the electronic device, a predetermined opening portion is provided in a case, and a display section and an operation section are exposed through the opening portion to the outside. In this case, a gap is formed between an opening edge of the opening portion and the display section or the operation section. The gap may be shielded by the dust-proof sheet 170 or 470. For example, a configuration in which the dust-proof sheet is attached to the display section or the operation section and the dust-proof sheet is pressed against an opening edge of the opening portion of the case from the inside may be employed.

According to the present disclosure, entrance of a foreign substance such as dust and dirt from the outside can be prevented or reduced, and therefore, the present disclosure is useful for devices having various shielding structures.

It will be appreciated by those of ordinary skill in the art that the invention is not limited to any one of the foregoing embodiments and can be embodied in other specific forms without departing from the spirit or essential character thereof. The above-described embodiments are merely examples in all respects and must not be construed to limit the invention. The scope of the present invention is defined by the scope of the appended claims and is not limited at all by the specific description of this specification. Furthermore, all the modifications and changes belonging to equivalents of the claims are considered to fall within the scope of the present invention.

What is claimed is:
1. A shielding structure, comprising:
a first member having an opening portion through which an axis passes;
a shielding member which shields the opening portion; and
a second member which presses a part of the shielding member located inside the opening portion toward the first member along a direction of the axis,
wherein
at least one slit or groove is provided in the shielding member such that, when the part of the shielding member located inside the opening portion is pressed toward the first member along the direction of the axis, the shielding member is deformed so that a central portion of the shielding member protrudes forward as compared to a peripheral portion thereof and twists and warps formed in the shielding member are absorbed by the at least one slit or groove.

2. The shielding structure of claim 1, wherein
the at least one slit or groove includes at least one first slit or first groove inwardly extending from an outer edge of the shielding member.

3. The shielding structure of claim 2, wherein
the opening portion has a substantially quadrangular shape, and
the at least one first slit or first groove is positioned at a corner portion of the opening portion.

4. The shielding structure of claim 2, wherein
the at least one slit or groove includes a second slit or a second groove extending along an opening edge of the opening portion outside a part of the shielding member which the second member contacts and inside the opening portion, and
the at least one first slit or first groove is connected to the at least one second slit or the second groove.

5. The shielding structure of claim 4, wherein
the opening portion has a substantially quadrangular shape,
the at least one first slit or first groove is positioned at a corner portion of the opening portion, and
the at least one second slit or second groove extends along a substantially straight portion of the opening edge of the opening portion.

6. The shielding structure of claim 1, wherein
the at least one slit or groove includes at least one second slit or second groove extending along an opening edge of the opening portion outside a part of the shielding member which the second member contacts and inside the opening portion.

7. The shielding structure of claim 6, wherein
the opening portion has a substantially quadrangular shape, and
the at least one second slit or second groove extends along a substantially straight portion of the opening edge of the opening portion.

8. An imaging device support structure, comprising:
a master flange having an opening portion through which an optical axis passes;
an imaging device which is directly or indirectly attached to the master flange and is positioned in the opening portion as viewed in a direction of the optical axis; and
a shielding member which shields a gap between the master flange and the imaging device in the opening portion, wherein
the shielding member includes at least one slit or groove and is pressed against an opening edge of the opening portion along the direction of the optical axis such that, when the shielding member is pressed against the opening edge of the opening portion along the direction of the optical axis, the shielding member is deformed so that a central portion of the shielding member protrudes forward as compared to a peripheral portion thereof and twists and warps formed in the shielding member are absorbed by the at least one slit or groove.

9. The imaging device support structure of claim 8, wherein
the at least one slit or groove includes at least one first slit or first groove inwardly extending from an outer edge of the shielding member.

10. The imaging device support structure of claim 9, wherein
the opening portion has a substantially quadrangular shape, and
the at least one first slit or first groove is positioned at a corner portion of the opening portion.

11. The imaging device support structure of claim 9, wherein
the at least one slit or groove includes at least one second slit or second groove extending along an opening edge of the opening portion in a part of the shielding member exposed through the gap of the opening portion, and
the at least one first slit or first groove is connected to the at least one second slit or second groove.

12. The imaging device support structure of claim 11, wherein
the opening portion has a substantially quadrangular shape,
the at least one first slit or first groove is positioned at a corner portion of the opening portion, and
the at least one second slit or second groove extends along a substantially straight portion of the opening edge of the opening portion.

13. The imaging device support structure of claim 8, wherein
the at least one slit or groove includes at least one second slit or second groove extending along an opening edge of the opening portion in a part of the shielding member exposed through the gap of the opening portion.

14. The imaging device support structure of claim 13, wherein
the opening portion has a substantially quadrangular shape, and
the at least one second slit or second groove extends along a substantially straight portion of the opening edge of the opening portion.

15. The imaging device support structure of claim 8, further comprising:
a tilt adjustment mechanism capable of adjusting a tilt of the imaging device relative to the master flange.

16. An imaging device support structure, comprising:
a master flange having an opening portion through which an optical axis passes;
an attachment member attached to the master flange;
an imaging device which is attached to the attachment member and is positioned in the opening portion as viewed in a direction of the optical axis; and
a shielding member which shields a gap between the master flange and the attachment member in the opening portion,
wherein
the shielding member includes at least one slit or groove and is pressed against an opening edge of the opening portion in the direction of the optical axis such that, when the shielding member is pressed against the opening edge of the opening portion in the direction of the optical axis, the shielding member is deformed so that a central portion of the shielding member protrudes forward as compared to a peripheral portion thereof and twists and warps formed in the shielding member are absorbed by the at least one slit or groove.

17. The imaging device support structure of claim 16, wherein
the at least one slit or groove includes at least one first slit or first groove inwardly extending from an outer edge of the shielding member.

18. The imaging device support structure of claim 17, wherein
the opening portion has a substantially quadrangular shape, and
the at least one first slit or first groove is positioned at a corner portion of the opening portion.

19. The imaging device support structure of claim 17, wherein
the at least one slit or groove includes at least one second slit or second groove extending along an opening edge of the opening portion in a part of the shielding member exposed through the gap of the opening portion, and
the at least one first slit or first groove is connected to the at least one second slit or second groove.

20. The imaging device support structure of claim 19, wherein
the opening portion has a substantially quadrangular shape,
the at least one first slit or first groove is positioned at a corner portion of the opening portion, and
the at least one second slit or second groove extends along a substantially straight portion of the opening edge of the opening portion.

21. The imaging device support structure of claim 16, wherein
the at least one slit or groove includes at least one second slit or second groove extending along an opening edge of the opening portion in a part of the shielding member exposed through the gap of the opening portion.

22. The imaging device support structure of claim 21, wherein
the opening portion has a substantially quadrangular shape, and
the at least one second slit or second groove extends along a substantially straight portion of the opening edge of the opening portion.

23. The imaging device support structure of claim 16, further comprising:
a tilt adjustment mechanism capable of adjusting a tilt of the imaging device relative to the master flange.

* * * * *